United States Patent [19]

Hardy et al.

[11] Patent Number: 4,647,646

[45] Date of Patent: Mar. 3, 1987

[54] HEAT CURABLE COMPOSITIONS

[75] Inventors: Alan Hardy; Reginald T. Agger; Andrew Crabtree, all of Leicester, England

[73] Assignee: USM Corporation, Flemington, N.J.

[21] Appl. No.: 764,680

[22] PCT Filed: Dec. 14, 1984

[86] PCT No.: PCT/GB84/00431

§ 371 Date: Aug. 2, 1985

§ 102(e) Date: Aug. 2, 1985

[87] PCT Pub. No.: WO85/02860

PCT Pub. Date: Jul. 4, 1985

[30] Foreign Application Priority Data

Dec. 22, 1983 [GB] United Kingdom ............... 8334297

[51] Int. Cl.[4] ..................... C08G 18/32; C08G 18/80
[52] U.S. Cl. ......................... 528/45; 528/60; 528/58; 427/13
[58] Field of Search ................... 528/45, 60

[56] References Cited

U.S. PATENT DOCUMENTS

| | | | |
|---|---|---|---|
| 4,280,944 | 7/1981 | Saito et al. | 528/45 |
| 4,395,530 | 7/1983 | Hammond | 528/48 |
| 4,543,393 | 9/1985 | Blum et al. | 528/45 |
| 4,559,383 | 12/1985 | Holubka et al. | 528/45 |
| 4,581,432 | 4/1986 | Blum et al. | 528/45 |

FOREIGN PATENT DOCUMENTS

| | | |
|---|---|---|
| 0004597 | 10/1979 | European Pat. Off. . |
| 0013890 | 8/1980 | European Pat. Off. . |
| 0059962 | 9/1982 | European Pat. Off. . |
| 0082618 | 6/1983 | European Pat. Off. . |
| 2515775 | 10/1975 | Fed. Rep. of Germany . |
| 2120014 | 8/1972 | France . |
| 1085454 | 12/1967 | United Kingdom . |
| 1107419 | 3/1968 | United Kingdom . |
| 1362674 | 8/1974 | United Kingdom . |
| 1414847 | 11/1975 | United Kingdom . |
| 1529319 | 10/1978 | United Kingdom . |
| 2048289 | 12/1980 | United Kingdom . |

*Primary Examiner*—Herbert S. Cockeram
*Attorney, Agent, or Firm*—Thomas S. Szatkowski

[57] ABSTRACT

Heat curable compositions, particularly solvent-based adhesive compositions suitable for use e.g. in flocking processes, are described and claimed. Known heat curable compositions require a relatively high temperature for cure. A one part non-toxic storage stable composition is provided which is cured by heat and comprises a polyurethane prepolymer formed from the reaction between a first NCO terminated prepolymer, an oxime blocking agent and a trifunctional primary amino compound used in a substantially stoichiometric amount to the amount of isocyanate groups of the first prepolymer available for reaction. The quantity of blocking agent is so chosen that statistically only one functional group of the triamine is reacted with the NCO groups of the first prepolymer available for reaction leaving two amine groups available for reaction with isocyanate groups of the prepolymer when they are unblocked by heating.

9 Claims, No Drawings

HEAT CURABLE COMPOSITIONS

TECHNICAL FIELD

This invention is concerned with heat curable compositions and production thereof, and is particularly concerned with solvent based adhesive compositions, and more particularly with adhesive compositions for use in the adhesive bonding of nylon or polyester flock to a primed polychloroprene, SBR or EPDM base layer.

It is known to employ one part blocked isocyanate polyurethane solution based adhesives as flocking adhesives.

BACKGROUND ART

It has been proposed to cure such a polyurethane adhesive by moisture from the atmosphere, with a small amount of triethanolamine also added to the composition to act as an auxiliary curing agent. In order to achieve a reasonable cure speed, however, it was found that a relatively high temperature was required to cure the adhesive. Temperatures of the order of about 200° C. for about 3 minutes have been found necessary, with consequent requirements for significant amounts of energy for heating the adhesive, and a significant time for cooling the product, and also risk of heat damage to sensitive parts.

Attempts to improve the cure speed by use of other amine curatives in addition to atmospheric moisture led us to improved cure properties. However, presence of free amine in the adhesive composition is regarded as a potential health hazard, and influences solution stability and cost of the adhesive.

For various reasons, it is often preferred to employ if possible a curable single part adhesive composition, in which all necessary ingredients for cure of the composition are present. In the case of polyurethane adhesives, this necessitates precautions to control untimely reaction between the isocyanate component and the curative, and it is necessary to achieve a satisfactory combination of storage stability and speed of cure when required.

It is known to employ single part compositions comprising a blocked isocyanate and a curative, see for example UK No. 1529319 and UK No. 1085454. Various blocking agents are known, for example phenols, lactams and ketoximes. It is known that phenol blocked isocyanates can react with hydrogen atoms of amino compounds to release the phenol and yield a polyurea which may have valuable properties in respect of mechanical and chemical resistance. An important result of such a reaction is release of the phenol which is regarded as unacceptably obnoxious e.g. in odour, if released to the atmosphere. By use of ketoxime blocked isocyanates one may realise various advantages stemming from inter alia the ability of the blocked isocyanate to be unblocked at a convenient temperature, and the comparatively unobjectionable nature of the released blocking agent which may remain in the composition when cured.

Amine cured adhesive compositions provide many of the properties required of flocking adhesives. However, amine curatives which we have found most beneficial in leading to acceptable heat cure conditions and mechanical and physical properties are also regarded as a potential health hazard when present as such in an adhesive composition subjected to heating.

We have now found that an improved one-part storage stable composition may comprise a blocked polyurethane prepolymer formed from specific amounts of selected raw materials.

DISCLOSURE OF INVENTION

The invention provides in one of its aspects a heat curable composition comprising a polyurethane prepolymer formed from reaction between a first prepolymer comprising the reaction product of an isocyanate and a polyol, a blocking agent and a curing agent, characterised in that the curing agent comprises a trifunctional primary amino compound, that the curing agent is used in a substantially stoichiometric amount to the amount of isocyanate groups of the first prepolymer available for reaction and that the blocking agent is used in a quantity to block approximately two thirds of the isocyanate groups of the first prepolymer available for reaction so that statistically one functional group of each amine molecule is reacted with the first prepolymer.

Compositions according to the invention may find use in a variety of applications, particularly in the field of coatings, adhesives and sealants. However, a primary intended use of the compositions is in the form of solvent based adhesive compositions, especially those for bonding flock to substrate materials (e.g. polychloroprene, SBR or EPDM based materials) intended for use as automobile door weatherseals, in which use various advantageous properties of the compositions may be utilised.

In a composition according to the invention the first prepolymer is an isocyanate terminated prepolymer containing urethane groups. The polyol used in preparing the first prepolymer in making a composition according to the invention may be any suitable polyhydroxy compound or mixture thereof and is preferably at least substantially difunctional polyol. When preparing solvent based adhesive compositions we prefer to use a hydroxy polyester obtained from polycarboxylic acids and polyhydric alcohols, or a polyether. Suitable polycarboxylic acids for use in preparation of the hydroxy polyester include adipic acid, sebacic acid, suberic acid, phthalic acid, and terephthalic acid, and suitable polyhydric alcohols which may be used in preparation of the polyesters include ethylene glycol, propylene glycol, butane diol, hexane diol. Polyethers may be obtained from any suitable alkylene oxide, for example ethylene oxide, 1,2 propylene oxide, 1,2 butylene oxide or tetrahydrofuran. If desired minor amounts of trifunctional materials, for example trimethylol propane may also be used. For flocking adhesives we prefer to employ polyoxypropylene glycols, because these contribute to softness and flexibility of the cured adhesive.

The polyol is reacted with an excess of an isocyanate to provide the first prepolymer having isocyanate groups available for reaction. The isocyanate preferably comprises a diisocyanate, however a small amount of a higher functional isocyanate may also be included. Where a diisocyanate is employed to provide the first prepolymer it may comprise an aliphatic, cycloaliphatic or aromatic diisocyanate. For solvent based adhesive compositions, we prefer to use aromatic diisocyanates because they contribute to strength, thermoplasticity and heat resistance of the adhesive composition. Suitable aromatic diisocyanates include the toluene diisocyanates and the diphenyl methane diisocyanates and their hydrogenated forms including for example diphenyl methane-4,4'-diisocyanate. The polyol and diisocyanate are reacted together and this may be done in presence of inert organic solvents. The reaction is carried out with quantities of materials such that the first prepolymer suitably has a molecular weight in the range 2000-3500, more preferably about 2500. The molecular weight influences adhesive characteristics and the viscosity/total solids of the composition. Higher molecular weights yield solutions of higher viscosity which may be inconvenient to apply from high solids solutions, and lower molecular weights yield less viscous compositions with lower initial adhesive strength and film forming characteristics, which may be inadequate for some bonding purposes. The quantities of materials are also chosen such that the first prepolymer has about 3½% by weight NCO groups per 100% by weight solids as determined by standard titration methods, available for reaction.

The blocking agent employed in production of a composition according to the invention may be any suitable blocking agent, however, preferably is an oxime, more preferably a ketoxime, for example dimethyl ketoxime, methyl ethyl ketoxime, methyl isobutyl ketoxime, benzophenone oxime, cyclohexanone oxime or acetophenone oxime. The blocking reaction may conveniently be carried out in inert organic solvent. In conducting the separate stages of reaction, it is important to ensure that the quantity of blocking agent employed is sufficient to mask sufficient of the isocyanate groups of the first prepolymer available for reaction to ensure that the ultimate curing reaction of the adhesive composition, when the blocking agent is released by heating, is carried to a desired extent via the isocyanate-amine reaction. It is also important to ensure that sufficient isocyanate groups of the first prepolymer are left available for reaction after the blocking reaction, in order that reaction may occur with the trifunctional primary amino compound.

In a composition according to the invention a trifunctional primary amino compound is used as the curing agent for the polyurethane prepolymer. Trifunctional primary amines lead to extensive cross-linking of the cured polymer thus producing a tough end product which is particularly suitable for producing flocked products which are required to withstand weathering and abrasion. It is envisaged that any trifunctional primary amine may be used, preferably however amine tipped polyoxypropylene polyether triols available under the trade name "Jeffamine" from Jefferson Corporation are used in a solvent-based adhesive according to the invention. The use of these particular triamines provides a product having an improved rate and lower temperature of cure as compared with conventional flocking adhesives and also provides a final product having a good resistance to solvents. The curing agent is used in substantially stoichiometric amounts to the amount of isocyanate groups of the first prepolymer available for reaction.

In a composition according to the invention, the quantities of blocking agent and amine cross-linking agent incorporated into the polyurethane prepolymer are so chosen that volatile amine per se is not present in the composition or is present in acceptably small quantities. In such a composition it is believed that some of the reactive isocyanate groups of the first prepolymer are blocked whereas some are employed to combine the trifunctional primary amine curing agent onto the first prepolymer. The curing agent is used in an amount to provide substantially equal numbers of active hydrogen groups of the triamine to isocyanate groups of the first prepolymer. In a composition according to the invention sufficient isocyanate groups of the first prepolymer are blocked by the blocking agent in the blocking reaction so that on reaction with the triamine statistically only one functional group of each trifunctional primary amine molecule may react with the first prepolymer. In a composition according to the invention it is desired that approximately one third of the isocyanate groups of the first prepolymer remain available, after reaction with the blocking agent, for reaction with the trifunctional primary amine, so that statistically only one functional group of each amine molecule is reacted with the first prepolymer. Thus, sufficient blocking agent is added in the blocking reaction to block ⅔ of the isocyanate groups of the first prepolymer available for reaction so that only one of the amine groups of the curing agent is incorporated into the polyurethane prepolymer thus leaving two unreacted functional groups available for reaction with the isocyanate groups liberated when the prepolymer is heated and the blocking agent released. In this way we believe that substantially all the trifunctional primary amine molecules are locked into the first prepolymer and therefore substantially no free amine remains in solution. If more than one functional group of each trifunctional primary amine molecule reacts with the prepolymer, gelling of the solution commences which is not desired especially in the production of solvent based adhesives. The composition may be cured by heating the blocked prepolymer to a temperature at which the blocking agent disassociates from the prepolymer thus liberating the masked isocyanate groups for reaction. The remaining functional groups of the triamine that have not reacted with the first prepolymer may now react with the isocyanate groups thus liberated and cure of the composition may thus occur.

Any suitable solvent, conveniently inert organic solvents, may be used as solvent in solvent based adhesive compositions according to the invention. Suitable solvents in xylene and tolune which we prefer to use as solvents in solvent based adhesive for flocking. Conveniently the reaction to produce the first prepolymer is conducted in xylene at a temperature of about 80° C. The subsequent stages of adding the blocking agent and curing agent may then be conducted in the same solvent. Catalysts may be employed to control speed of reaction for example dibutyl tin dilaurate. Catalysts are preferably added to the composition after the addition of the curing agent to remain in the composition, being effective to influence the curing reaction when the adhesive comes to be used.

If desired, in preparing adhesive compositions according to the invention adjuvants normally used in compounding adhesives may be included in the composition, although this is not essential. Adjuvants which may be employed include, for example, tackifying resins, colourants, solvents and fillers.

A solvent based adhesive composition according to the invention may conveniently comprise 50% total solids and may be applied to a workpiece in any convenient manner, for example, by spray, brush or roller. It may be subjected to curing conditions including heating. The speed of cure is influenced by the cure temperature which may be as high as desired commensurate with avoiding damage to the substrates being bonded and to degrading of the polyurethane. For example one may employ temperatures of the order of 160° C. to effect sufficient cure in 3 minutes. However temperatures as high as 200° C. for 3 minutes are not harmful to the adhesive and may produce a more rapid cure.

By use of a composition according to the invention it is possible to provide solvent based adhesives having a low health hazard, a lower temperature of cure, an improved solvent resistance and also a tougher end product as compared to conventional adhesives.

In order that the invention may become more clear there now follows a description of one example composition according to the invention and illustrative thereof and an example of its use. It is to be understood that the illustrative composition is selected for description to illustrate the invention by way of example only.

MODE FOR CARRYING OUT THE INVENTION

EXAMPLE 1

The illustrative composition was a solvent based adhesive composition and comprised a ketoxime blocked polyurethane prepolymer curable by heating to 160° C. and formed from the stages of reaction as hereinafter described.

In a first stage (a) of reaction, a mixture of 10 kgs Propylan D402 and 4.62 kgs Propylan D1002 (polyoxypropylene diols of molecular weight 400 and 1000 respectively available from Diamond Shamrock) were dehydrated until the composition contained less than 0.05% by weight water. 5.1 litres of xylene were added and the composition heated to a temperature of approximately 75° C, when 10 kgs diphenyl methane-4,4'-diisocyanate (available from Bayer under the trade name "Desmodur 44 Pure") were added. The composition was then heated to 80° C. and allowed to react for two hours. A determination of the percentage of isocyanate groups of prepolymer available for reaction was carried out by a standard titration technique and was found to be 3.45% by weight of the solution.

In a second stage (b) of reaction 1.38 kgs methyl ethyl ketoxime was added to the prepolymer to block ⅔ of the NCO groups available for reaction with 2 litres of toluene also added. Following reaction at 80° C. for one hour, 11½ litres methyl isobutyl ketone plus 6 litres xylene and 4 litres toluene were added.

In the third stage (c) of the reaction, the temperature of the solution was reduced to 30° C. and 3.38 kgs Jeffamine T403 (an amine tipped polyoxypropylene polyether triol available from Jefferson) and 2 liters xylene were added. The amount of amine added to the partially blocked first prepolymer was calculated to ensure that the number of isocyanate groups of the prepolymer at the end of the first stage of reaction was approximately equal to the number of functional groups of the triamine and only statistically one amine group of each Jeffamine molecule was reacted into the partially blocked prepolymer from stage (b). The solution was then constantly stirred for one hour after which 0.008 kgs dibutyl tin dilaurate catalyst (available under the trade name "Stanclere TL") was added. The solution was diluted to a viscosity value of 3 poise by the addition of a mixture of 1 volume xylene, 1 volume methyl isobutyl ketone and ½ volume toluene. The resulting blocked polyurethane prepolymer was stored until desired for use. When it was desired for use the adhesive was applied to a workpiece and the composition heated to unblock the blocked isocyanate groups and permit the isocyanate groups thus liberated to react with available amine groups of the trifunctional primary amine.

The illustrative composition was compared with a standard competitive adhesive, (a blocked polyurethane prepolymer composition which may be cured by heating). Results relating to the cure conditions required for each adhesive composition may be seen in Table 1.

Test A is defined as the temperature at which on heating for 3 minutes, the adhesive film will solidify in 1 minute on cooling.

Test B is defined as the temperature at which on heating for 3 minutes, the adhesive film becomes ethyl acetate insoluble after ageing 1 day.

TABLE 1

|        | Example 1 | Competitive Adhesive |
|--------|-----------|----------------------|
| Test A | 160° C.   | 250° C.              |
| Test B | 160° C.   | 215° C.              |

In both cases the temperature required was seen to be significantly lower for the illustrative composition than for the comparative example. Test A shows that a solid film can be achieved with a lower temperature using the illustrative composition and Test B, which gives an indication of the extent of cross-linking of the polymer, also shows that the temperature of cure to produce an ethyl acetate insoluble film for the illustrative composition is much lower for the illustrative composition than for the comparative example.

The illustrative composition was found to be a stable solution; it was found to thicken after approximately six months storage at 15° C. in a sealed can.

Toughness of films of the adhesive composition cured for three minutes at 190° C. followed by one day ageing at room temperature was found to be excellent compared with adhesives in current use.

There now follows a description of a method of flocking using the illustrative adhesive composition. The example method comprised priming a rubber profile e.g. a car door weatherseal of compounded SBR, and applying the illustrative composition to the parts of the profile desired to be covered with polyester flock. The flock was applied to the rubber profile and adhesive coating by a known electrostatic process and the adhesive was cured by heating in an oven to 160° C for 3 minutes thereby bonding the flock to the rubber profile.

We claim:

1. A heat curable composition comprising (a) a polyurethane prepolymer formed by reacting a polyisocyanate and a polyol, (b) a blocking agent and (c) a curing agent comprising an amine tipped polyoxypropylene polyether triol, (c) being present in substantially stiochimetric amount relative to the available isocyanate groups of (a), and (b) being used in a quantity to block approximately two thirds of available isocyanate groups of (a) so that statistically one functional group of each molecule of (c) is reacted with (a).

2. A composition according to claim 1 characterised in that the polyurethane prepolymer comprises about 3½% be weight NCO groups per 100% by weight solids available for reaction.

3. A composition according to claim 1 characterised in that the isocyanate comprises an aromatic diisocyanate including diphenyl methane- 4,4'-diisocyanate.

4. A composition according to claim 1 characterised in that the blocking agent comprises an oxime.

5. A composition according to claim 1 characterised in that the blocking agent comprises methyl ethyl ketoxime.

6. A composition according to claim 1 characterised in that the polyol comprises a polyoxypropylene diol.

7. A composition according to claim 6 characterised in that the polyoxpropylene diol comprises a diol of molecular weight of about 400 and a diol of molecular weight of about 1000.

8. A composition according to claim 1 characterised in that the molecular weight of the polyurethane prepolymer is about 2,500.

9. A composition according to claim 1 characterised in that the composition is a solvent based adhesive composition and has a solids content of about 50%.

* * * * *